May 4, 1937.                  C. S. HAZARD                    2,079,451
                     COMPUTING AND REGISTERING DEVICE
                        Filed Sept. 19, 1934          3 Sheets-Sheet 1

May 4, 1937.   C. S. HAZARD   2,079,451
COMPUTING AND REGISTERING DEVICE
Filed Sept. 19, 1934   3 Sheets-Sheet 3

INVENTOR
Charles S. Hazard
BY
ATTORNEYS

Patented May 4, 1937

2,079,451

UNITED STATES PATENT OFFICE 2,079,451

COMPUTING AND REGISTERING DEVICE

Charles S. Hazard, New York, N. Y., assignor to Neptune Meter Company, New York, N. Y., a corporation of New Jersey Application September 19, 1934, Serial No. 744,647

3 Claims. (Cl. 74—328)

The present invention relates to registers and embodies, more specifically, an improved register mechanism by means of which volume as well as price may be indicated for a given metering operation. More particularly, the invention embodies an improved register mechanism wherein means is provided for computing the price of a given metered volume of fluid for varying prices per unit volume. In this connection, registers have been designed wherein computing mechanisms are provided, the computing mechanisms being driven from the meter actuated driving mechanism by means of removable gear sets, the ratios of the gear sets being such as to transmit motion to the computing mechanism from the driving means in accordance with the price of the fluid per unit volume. In these previous devices, provision has been made for computing the total price for varying unit prices by removing the gear set, above referred to, and replacing it with gear sets of varying ratios in accordance with the spread of variations in unit price of the fluid metered.

As distinguished from these prior structures, the present invention provides an improved simplified self-embodied price computing mechanism which is capable of indicating the total price of a volume of fluid metered for various prices per unit volume, the structure being provided with means whereby the price per unit volume, upon which computations are based, may be varied in any desired fashion without the necessity of providing removable and replaceable elements in the structure.

A further object of the invention is to provide a register of the above character wherein the driving and computing elements are so formed and assembled as to reduce the number thereof to a minimum, the structure being such as to enable the elements to be assembled in compact and convenient relationship and affording a mechanism which is simple and effective in operation and which is absolutely accurate in computing.

Further objects, not specifically enumerated above, will be apparent as the invention is described in greater detail in connection with the accompanying drawings, wherein.

Figure 1:
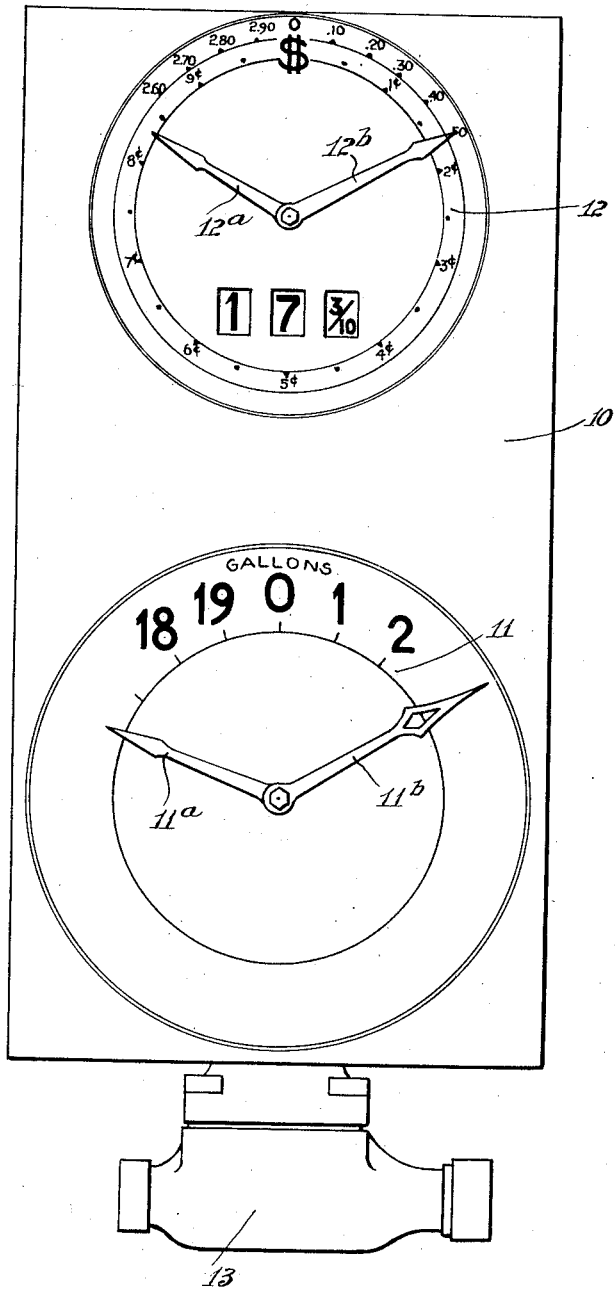
Figure 1 is a view in front elevation, showing a register constructed in accordance with the present invention and provided with dials to indicate gallons as well as price.

With reference to the above drawings, the invention will be seen to be embodied in a mechanism having a face 10 upon which two dials 11 and 12 are formed, the dial 11 serving to indicate volume, as in gallons, and the dial 12 the price of the fluid dispensed as computed by the mechanism to be described hereinafter. Two hands or pointers 11$^a$, 11$^b$, and 12$^a$, 12$^b$, may be provided for each dial to indicate whole and fractional parts of units, in the manner now commonly employed in devices of this character. A meter 13 is shown at the bottom of Figure 1 and may be of any well known form, this meter being provided with a spindle 14 (Figure 2) which serves as the driving element for the registers employed.

Upon the upper portion of the meter structure 13 (Figure 2) a register housing 15 is mounted, the face 10 of the mechanism shown in Figure 1 serving as the front or face of the housing 15. Motion from the shaft 14 is delivered to indicator hands 11$^a$ and 11$^b$ through a shaft section 16 which is suitably coupled to the shaft 14; gear set 17, 18; jack shaft 19; gear set 20 and 21; shaft 22; worm and worm wheel connection 23, and spindle 24. The shafts 16 and 19 may be mounted upon a plate 25 which is carried within the register housing 15 while the shaft 22 may be suitably journaled in the housing in such fashion that the gears thereon may be maintained in driving engagement with the cooperating gears on the shaft 19 and spindle 24, respectively. The indicator hand 11$^a$ is mounted upon a sleeve 26 which is driven by a gear 27 which may be driven by any well known speed reducing mechanism commonly used in devices of this character wherein the movement of an indicator hand is coordinated with the movement of a cooperating hand to cause the former to indicate units while the latter indicates fractions thereof. In the interest of simplicity, such mechanism is not shown in detail herein inasmuch as it is commonly known and employed extensively in the art. A mechanism of this general character is shown, for example, in U. S. Patent No. 1,563,770.

Figure 3:
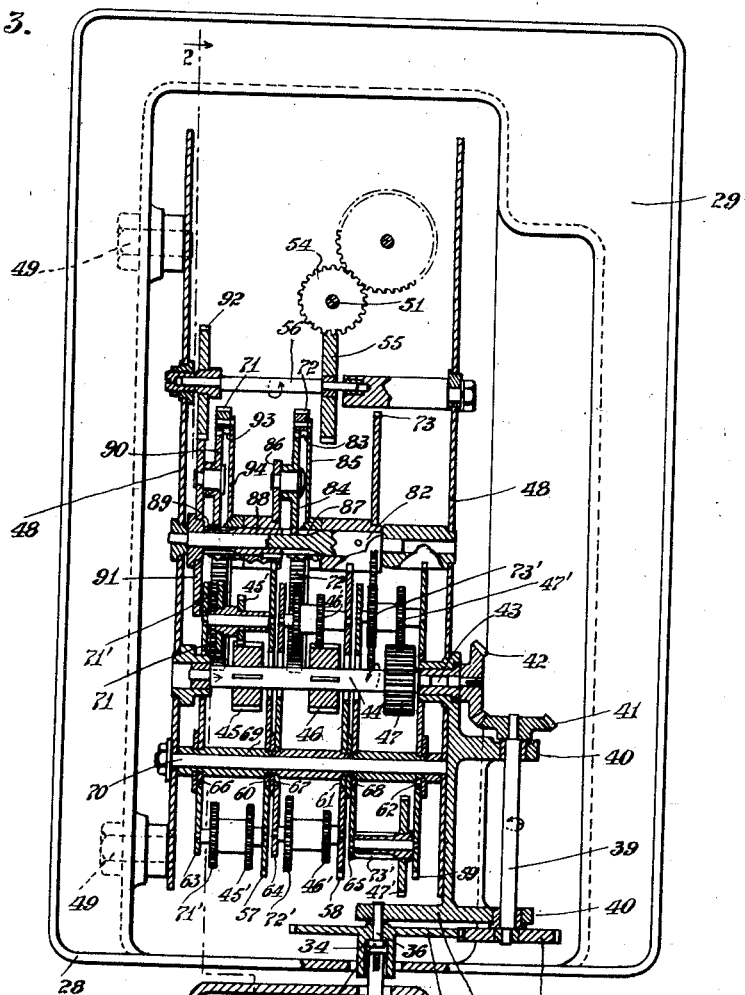
Figure 3 is a view in section, taken on the broken line 3—3 of Figure 2, and looking in the direction of the arrows, this sectional view showing the manner in which the several components of the amount of sale are computed from the computer drive shaft.

The shaft 19 also serves as a means for driving a price computing mechanism and register which may be housed within a housing 28. The front of the housing may be flanged as shown at 29, the front plate 10 being received thereon. Upon the shaft 19, a driving gear 30 is mounted, this gear engaging a cooperating gear 31 on a vertical spindle 32 (Figure 3). The spindle 32 is coupled to a vertical shaft 33 which is coupled to a sleeve 34, upon which a driving gear 35 is mounted. The sleeve 34 is centered by a stud 36 which is set in a suitably formed portion 37 of the register supporting frame carried within the housing 28, the stud being provided with a head 36' which prevents the gear 35 from falling off. Gear 35 meshes with a gear 38 which is mounted upon a shaft 39, journaled in brackets 40 on the register supporting frame, the upper end of shaft 39 being provided with a bevel gear 41 which engages a cooperating bevel gear 42. The bevel gear 42 is coupled at 43 with a computing drive shaft 44 upon which three similar driving gears 45, 46 and 47 are secured. The drive shaft 44 is journaled at its ends in spaced supporting plates 48, the supporting plates being suitably mounted in the register housing 28 as shown at 49 in Figure 3.

Figure 2:
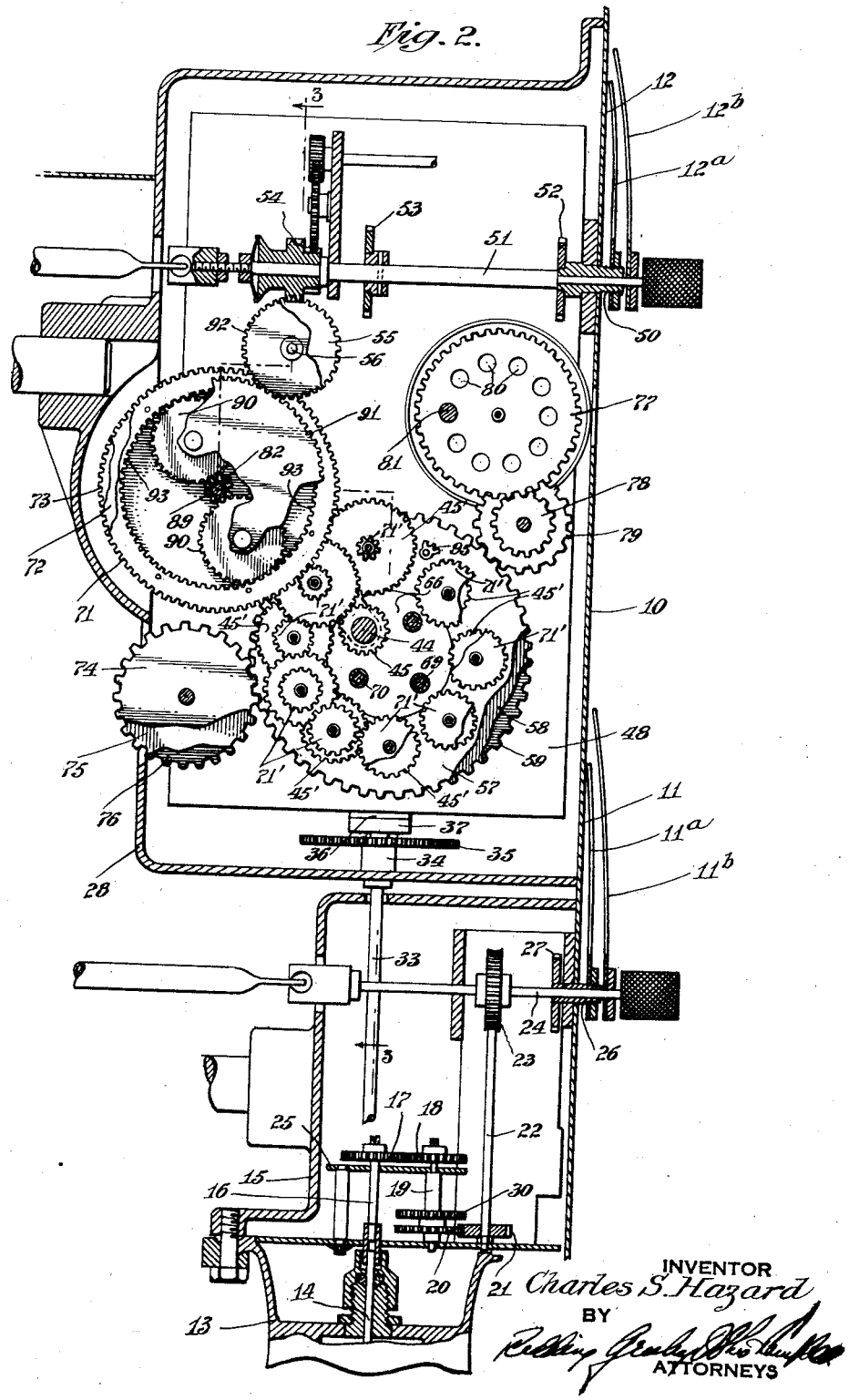
Figure 2 is a view in section, taken on the broken line 2—2 of Figure 3, and looking in the direction of the arrows, this view illustrating the computing mechanism by means of which the amount of sale may be properly registered for varying rates.

As shown in Figure 2, the indicator hands 12ᵃ and 12ᵇ are driven by sleeve 50 and shaft 51, respectively. The sleeve 50 is, in turn, driven by a gear 52 which receives motion from a gear 53, mounted upon shaft 51, through a suitable speed reducing gear train shown in the Patent No. 1,563,770 and similar to the gear train referred to as driving the gear 27 for actuating the hand 11ᵃ. Shaft 51 is driven by a helical gear 54 which is driven by a helical gear 55, mounted upon a jack shaft 56, suitably journaled between the supporting plates 48.

Shaft 56 thus becomes the driving shaft for the price registering mechanism and the motion transmitted to this shaft must thus be properly proportioned to the motion of the driving mechanism for the gallons register. Inasmuch as the shaft 44 is geared directly to the driving mechanism for the gallons register, the mechanism for computing, properly, the price or amount of sale must be the transmission mechanism between the shaft 44 and the jack shaft 56. It is with this transmission mechanism, by means of which the price or amount of sale of a given indicated volume is registered, that the present invention is concerned and, as the description of this transmission mechanism progresses, it will be seen that the three elements of price are properly computed by a series of planetary gear mechanisms, each of which adds its motion to the motion transmitted to the jack shaft 56.

In order that proper settings may be made for various unit prices, a series of different gear sets is provided to transmit motion between the gears 45, 46 and 47 and the cooperating gears driven therefrom to compute the total price. For example, where the price per gallon of fluid dispensed is to be indicated by tens, units, and fractions of a unit, three such series of gear sets or translating devices are necessary. These series of gear sets are independently mounted and constructed in such fashion that they may be successively and independently moved into engagement with the respective gears 45, 46, 47 and the driven gears of the computing mechanism. Inasmuch as all of the independent series of gear sets are identical, only one such series will be described in detail.

Each of the translating devices or series of gear sets by means of which the unit price, upon the basis of which computations are to be made, may be changed, is formed as an assembly upon ring gears 57, 58 and 59. These ring gears are journaled upon discs 60, 61 and 62, respectively. Cooperating plates 63, 64 and 65 are provided for each of the ring gears 57, 58 and 59, respectively, and each of the last named plates is of annular formation and journaled upon discs 66, 67 and 68, respectively. The discs 60, 61 and 62 and 66, 67 and 68, are mounted upon spacer sleeves 69 through which through bolts 70 pass. It is preferred that three bolts 70 be provided to secure the gear assemblies together between the plates 48. By means of the foregoing structure, each of the annular gear assemblies is rotatably mounted about an axis upon and adjacent which no part of the respective rotatable assemblies is positioned. The structure thus provides a central portion within which other mechanism may be received and, as will be seen in Figures 2 and 3, the drive shaft 44 is received within this central portion.

Between each of the ring gears 57, 58, 59 and the respective plates 63, 64, 65, a plurality of gear sets are journaled, the gear sets each being formed with a plurality of gears 45', 46' and 47' which are adapted to engage the respective gears 45, 46 and 47. Motion of the gears 45', 46' and 47' is transmitted to gears 71, 72 and 73 by a plurality of gears 71', 72' and 73', respectively, each of the gears 71' being formed upon, or directly secured to the respective gears 45'; each of the gears 72' being similarly secured to the respective gears 46' and each of the gears 73' being similarly secured to the respective gears 47'. The teeth upon the several gears 71' all differ in number as do the teeth upon the respective gears 72' and 73'. In this fashion, the cooperating gears 45', 71'; 46', 72'; and 47', 73' form a plurality of gear sets or couplings the ratios of which differ in such fashion that proper speed reductions may be accomplished in transmitting motion from the several gears 45, 46 and 47 to the respective gears 71, 72 and 73.

Figure 4:
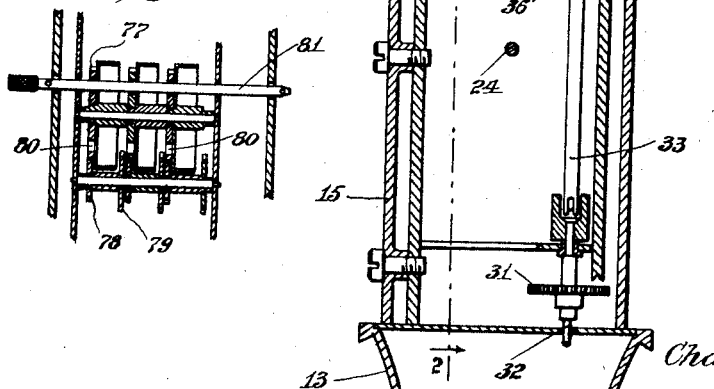
Figure 4 is a detail view showing the lock pin and wheel construction by means of which the elements of the computing mechanism may be locked in any desired computing position.

In order that any desired gear set on the several assemblies may be manually selected, manually operated gears 74, 75 and 76 are provided to engage with the respective gears 57, 58 and 59. Gears 74, 75 and 76 extend through the wall of the housing 28 and may thus be manually shifted. To facilitate the proper setting of the several gear assemblies, indicator gears 77 are provided for each of the gear sets. These gears are engaged by pinions 78 (Figure 2) which are driven by gears 79 which engage with the respective gears 57, 58 and 59. In this fashion, the unit price per gallon is always displayed through the front plate 10. As shown in Figures 2 and 4, each of the gears 77 is provided with a number of apertures 80 corresponding to the number of gear sets on the gear assemblies or translating devices. When the gears 77 have been moved to the desired position, a pin 81 is inserted through aligned apertures of the coaxial gears 77 and through the walls of the housing to locate the gears in the desired position.

It will be seen, from an inspection of Figure 2, that each of the gear assemblies is manually rotatable about an axis which is parallel to the axis of the gears 71, 72 and 73. Inasmuch as each of the gear sets on each assembly is of different ratio, the axis of each of the gear sets is spaced a different distance from the axes of the assemblies. This is true because each of the gears 71', 72' and 73' must engage the respective gears 71, 72 and 73, as the respective gear sets are rotated into coupling position between the respective gears 71, 72, 73 and the gears 45, 46 and 47. In this connection, each of the gears 45', 46' and 47' is adapted to move into engagement with the respective gears 45, 46 and 47 as the gear sets are moved into the coupling position above referred to. It will thus be seen that, as the number of teeth on the gears 71', 72' and 73' increases, the axes thereof lie nearer the axis of the ring gears 57, 58 and 59. In order that the gears 71, 72 or 73 may be engaged and locked in position corresponding to zero on the indicating wheels 77, each of the gears 57, 58 and 59 is provided with a small toothed member, one of which is shown at 95 in Figure 2 secured rigidly thereto and having two or three teeth which may be moved into engagement with the respective first gears to lock the same against rotation.

In the form of the invention shown, the shaft 44 is illustrated as having its axis eccentric to the common axis of the gears 57, 58 and 59. This is merely an expedient in reducing the number of parts and simplifying the structure. Obviously, the axis of the shaft 44 might be otherwise positioned with the introduction of additional gear trains to transmit the motion between the shaft and the several gear sets.

The mechanism, by means of which computation of the price or amount of sale is effected, includes the gears 71, 72 and 73, previously described. The gear 73 is secured to a shaft 82 and is engaged, as previously described, by a selected one of the gears 73'. The gear 72 is formed with internal teeth 83 with which planetary pinions 84 engage. The gear 72 is rotatably mounted upon a disc 85 in order that it may be properly positioned upon the shaft 82 and the planetary pinions 84 are journaled upon a rotatable disc 86 and engage teeth 87, formed upon the shaft 82.

Disc 86 is secured to a sleeve 88 upon which teeth 89 are formed, teeth 89 being engaged by planetary pinions 90 which are mounted upon a gear 91. Gear 91 engages a gear 92, upon the jack shaft 56, to drive the register mechanism previously described. The planetary pinions 90 also engage internal teeth 93, formed upon the gear 71, the gear 71 being properly positioned by a plate 94 which is carried either loosely or flexibly upon the shaft 82.

It will thus be seen that motion of each of the gears 45, 46 and 47 is transmitted to the respective gears 71, 72 and 73, the last named gears cumulating the motion thereof in predetermined ratios to apply the accumulated motion to gear 91. The rotation imparted to the gear 71 from gear 45 causes precession of planet pinions 90, thus rotating gear 91 an amount proportional to the rotation of shaft 44, multiplied by the ratio between the numbers of teeth on gears 71' and 45'. The motion contributed by the gear 46 through the gear 72 will be seen to be one-tenth of that contributed by the gear 71 inasmuch as the number of teeth on the sun gear 89 is one-tenth of the number of teeth on the ring gear 93. The standard formulas for planetary systems will make this readily apparent. In this fashion, the planetary system driven by the gear 72 adds to the direct drive afforded by the gear 71 an additional motion which is proportional to one-tenth of the product of the rotation of shaft 44 multiplied by the ratio of the number of teeth on gears 71' and 46'.

Inasmuch as the number of teeth on the gear 83 is ten times the number of teeth on the sun gear 87, the motion contributed by the gear 83 is one-tenth of the motion contributed by the gear 87 or one one-hundredth of the motion contributed by gear 71. In this fashion, gear 73 adds an additional one one-hundredth of the motion of gear 71 to the gear 91 and the three elements of the price (tens, units, and fractions of a unit) are properly combined to register the total amount of sale of the number of gallons indicated.

The ratios of the number of teeth on the gears above described obviously may vary in accordance with the specific operations to be performed. Moreover any combinations involving three or more elements of price may be utilized by properly proportioning of the teeth in the planetary systems. For example, the price in English pounds, shillings and pence, as well as the basic price in United States dollars plus the State and Federal taxes may be computed by properly proportioning the teeth in the planetary systems, and while the invention has been described with specific reference to the accompanying drawings, it is not to be limited, save as defined in the appended claims.

I claim as my invention:

1. In an apparatus of the character described the combination of a mechanism to be actuated, a source of motion, a drive shaft driven by the source of motion, a plurality of annular rotatable translating devices, each having a plurality of gear sets thereon, the drive shaft being journaled within the annular devices, gears on the drive shaft adapted to be engaged by a selected one of the gears of the gear sets of the respective translating devices, a first planetary gear train having a ring gear adapted to be engaged by a selected one of the gears of the gear sets of one of the respective translating devices, the planet pinions of the first train being mounted on the first named gear, and a second planetary gear train having a ring gear adapted to be engaged by a selected one of the gears of the gear sets of another of the respective translating devices, the planet pinions of the second train driving the sun gear of the first train.

2. In an apparatus of the character described the combination of a mechanism to be actuated, a source of motion, a drive shaft driven by the source of motion, a plurality of annular rotatable translating devices, each having a plurality of gear sets thereon, the drive shaft being journaled within the annular devices, gears on the drive shaft adapted to be engaged by a selected one of the gears of the gear sets of the respective translating devices, a first planetary gear train having a ring gear adapted to be engaged by certain of the gears of the gear sets of one of the respective translating devices, the planet pinions of the first train being mounted on the first named gear, a second planetary gear train having a ring gear adapted to be engaged by a selected one of the gears of the gear sets of another of the respective translating devices, the planet pinions of the second train driving the sun gear of the first train, a gear driven by a selected one of the gears of the gear sets of another of the respective translating devices, and means to actuate the sun gear of the second train by the last named gear.

3. In an apparatus of the character described the combination of a mechanism to be actuated, a source of motion, a drive shaft driven by the source of motion, a plurality of annular rotatable translating devices each having a plurality of gear sets thereon, the drive shaft being journaled within the annular devices, gears on the drive shaft adapted to be engaged by a selected one of the gears of the gear sets of the respective translating devices, a first planetary gear train having a ring gear adapted to be engaged by a selected one of the gears of the gear sets of one of the respective translating devices, the planet pinions of the first train being mounted on the first named gear, a second planetary gear train having a ring gear adapted to be engaged by a selected one of the gears of the gear sets of another of the respective translating devices, the planet pinions of the second train driving the sun gear of the first train, a gear driven by a selected one of the gears of the gear sets of another of the respective translating devices, and means to actuate the sun gear of the second train by the last named gear, the ratios of the last named gear and the ring gears of the planetary trains to the sun gears of the planetary trains being in equivalent ratios.

CHARLES S. HAZARD.